(12) United States Patent
Kakei (10) Patent No.: US 8,403,563 B2
(45) Date of Patent: Mar. 26, 2013

(54) LINEAR MOTION GUIDE UNIT WITH JOINTS FOR SMOOTH GUIDE OF AXIALLY OPPOSITE ENDS OF ROLLERS

(75) Inventor: Shigeki Kakei, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 938 days.

(21) Appl. No.: 12/170,410

(22) Filed: Jul. 9, 2008

(65) Prior Publication Data

US 2009/0016654 A1    Jan. 15, 2009

(30) Foreign Application Priority Data

Jul. 9, 2007  (JP) ................................. 2007-179786

(51) Int. Cl.
*F16C 29/06*    (2006.01)
(52) U.S. Cl. ........................................................ 384/44
(58) Field of Classification Search .................... 384/43, 384/44, 45
See application file for complete search history.

(56) References Cited

U.S. PATENT DOCUMENTS

| | | | | | |
|---|---|---|---|---|---|
| 4,902,143 | A | * | 2/1990 | Morita ............................. | 384/43 |
| 5,308,164 | A | * | 5/1994 | Tanaka ............................ | 384/13 |
| 6,132,093 | A | * | 10/2000 | Michioka et al. ................ | 384/45 |
| 7,134,790 | B2 | * | 11/2006 | Wang et al. ...................... | 384/45 |
| 7,150,564 | B2 | * | 12/2006 | Lee ................................... | 384/45 |
| 7,632,017 | B2 | * | 12/2009 | Akiyama et al. ................. | 384/45 |
| 2006/0078237 | A1 | * | 4/2006 | Ishihara ........................... | 384/45 |
| 2007/0053619 | A1 | * | 3/2007 | Kuwabara ........................ | 384/13 |

FOREIGN PATENT DOCUMENTS

| | | |
|---|---|---|
| JP | 04-194413 | 7/1992 |
| JP | 2007-092902 | 4/2007 |

* cited by examiner

*Primary Examiner* — Thomas R Hannon
*Assistant Examiner* — Alan Waits
(74) *Attorney, Agent, or Firm* — Browdy and Neimark, PLLC (57) ABSTRACT

A linear motion guide unit is envisaged smooth transfer of a roller from a turnaround passage to a return passage and vice versa across a joint between the turnaround passage and the associated return passage. Protrusions extending stepwise from an end of the turnaround passage come into complementary fit joints with an associated end of a tubular member defining the return passage to make wall surfaces to guide axially opposite ends of the roller, in which the joints are staggered or different in their locations between wall surfaces. The return passage is defined with a fore-and-aft hole of rectangular shape in transverse section inside a tubular member that fits into a bore made in the carriage. The tubular member is joined at lengthwise opposite ends thereof together to the protrusions that are raised above end surfaces of the end caps to extend the turnaround passage into the bore. Edges of the protrusions come into complementary fit joints with the associated ends of the tubular member to provide wall surfaces to guide axially opposite ends of the roller.

4 Claims, 8 Drawing Sheets

FIG. 15

LINEAR MOTION GUIDE UNIT WITH JOINTS FOR SMOOTH GUIDE OF AXIALLY OPPOSITE ENDS OF ROLLERS

FIELD OF THE INVENTION

The present invention relates to a linear motion guide unit with small rollers comprised of, for example an elongated guide rail and a slider that fits over or conforms to the guide rail to move relative to the elongated guide rail by virtue of more than one small roller.

BACKGROUND OF THE INVENTION

Linear motion guide units are extensively used in recent years with installed in the relatively sliding parts in machinery including machine tools, assembling machines, conveyors, semiconductor fabricating equipment, measuring instruments, and so on, while finding further increased applications in various industrial fields. Moreover, the linear motion guide units of the class using more than one roller, although used in diverse industrial fields, are still needed to get more in stiffness and accuracy, shrunken in size, and more adaptable to severe operating conditions including high velocity and high acceleration/deceleration in sliding movement. The design requirements as stated just earlier are needed especially in semiconductor fabricating equipment and measuring instruments.

In commonly-assigned Japanese Laid-Open Patent Application H04-194 413, a linear motion guide unit with four rows of circulating circuits for more than one rolling element is disclosed in which there are provided a lengthwise sleeve to define a return passage therein and forward and aft end caps to define turnaround passages therein, lengthwise opposite ends of the sleeve and the mating surfaces around the turnaround passages of the end caps being made in complementary to each other to come into close fit-engagement with each other. On the lengthwise opposite ends of the sleeve, there are made raised portions and recessed portions. On the mating surfaces around the turnaround passages of the end caps, in contrast, there are recessed portions to conform to the raised portions on the sleeve and raised portions to fit into the recessed portions on the sleeve. The fitted construction between the sleeve and the end caps as stated earlier helps determine with accuracy the relative location among the carriage, sleeve and the end caps to keep the return passage and the associated turnaround passages in precise alignment with each other.

The linear motion guide unit with four rows of circulating circuits constructed as stated earlier, nevertheless, has need in years of certain positively smooth rolling of the rollers through the circulating circuit even with rollers slenderer than ever to cope with recent demands for miniaturization, high operating-velocity and diverse purposes of the linear motion guide units. With the prior linear motion guide unit as recited earlier, the recessed portion on the sleeve and the associated raised portion on the end cap come into complementary mating relation with one another along three sides of a rectangle viewed in transverse section of the return passage. With the linear motion guide unit using the rollers, especially rollers small in diameter, thus, the mating construction between the sleeve and the associated end cap has to be made less in discrepancy between them, that is, made with high-precision assembly to provide the smooth circulating circuit in which the rollers are ensured to roll through there without getting stumbled on the mating construction.

Another linear motion guide unit is disclosed in Japanese Laid-Open Patent Application 2007-92 902, in which a sleeve to define a return passage is lighter in location and assembly thereof, and further effective in keeping operating performance and noise characteristics against getting worse. With the prior linear motion guide unit, the sleeve to define the return passage is beveled at longitudinally opposite ends thereof to make obliquely open ends and against each of which outside and inside halves of a spigot extended beyond an end cap are brought into close abutment against the oblique ends to form an end-to-end contact plane lying askew between the sleeve and the associated spigot halves. The return passage inside the sleeve is made circular in transverse section in conformity with the rolling element of ball.

With the prior linear motion guide unit constructed as stated earlier, the sleeve and the spigots have to come into close abutment against each other with no gap at the end-to-end contact plane between them because the sleeve is made circular in the outside contour thereof as well. Any gap at the end-to-end contact plane between the sleeve and the associated end caps would allow the sleeve turning over the gap. Some turning of the sleeve can lead to no practical problem when the balls are selected as the rolling elements. With the sleeve rectangular in transverse section to allow the rollers running through there, in contrast, any turning or angular displacement of the sleeve, albeit slightly, causes any staggered relation in rectangular return passage between the sleeve and the associated end cap, getting the circulating motion of the rollers interfered.

A further another prior linear motion guide unit, although not shown, is known in which the spigot with no split raised above the inward surface of the end cap in communication with the turnaround passage to have the right flat extremity extends somewhat into a longitudinal bore inside the carriage to come into direct abutment against a sleeve, thereby connecting the sleeve with any one opening of the turnaround passage made in the end cap, the opening coming face-to-face with the return passage. With the connecting construction as stated just earlier, the guide surface extending out of the inward surface of the end cap to carry the axially opposite ends of the roller comes into direct abutment against the associated end of the sleeve over the entire width thereof. Thus, even if there is any gap between the sleeve and the associated spigot, the rollers are apt to stumble on the gap when rolling across the connecting construction to lean or topple over to fall into the gap.

In the linear motion guide units in which the rollers or needles are selected as rolling elements, the rollers have to be guided not only on their circular rolling surfaces, but also on their axially opposite end surfaces to run through the circulating circuit in good rolling order without leaning in rolling posture. Especially, the rollers small in diameter or needles are easy to encounter any obstacle at even tiny gap lying on a butt joint between the return passage and the associated turnaround passage. Thus, it still remains a significant challenge to ensure smooth, steady rolling motion of the rollers throughout the circulating circuit.

SUMMARY OF THE INVENTION

The present invention has for its primary object to overcome the major challenge as stated earlier in the prior linear motion guide units, and to provide a linear motion guide unit in which more than one roller serving as rolling elements is allowed to roll smoothly across joints between turnaround passages and the associated return passages. More particularly, the present invention provides a linear motion guide unit in which protrusions extending stepwise from an end of the turnaround passage come into complementary fit joints with an associated end of a tubular member defining the return passage to make wall surfaces to guide axially opposite ends of the roller, and the protrusions to guide the axially opposite ends of the roller are bisected into two halves which are different from each other in length spaced away from the end surface of the end cap to make the complementary fit joints witch a tubular member to define the return passage therein at different locations along the rolling direction of the roller, whereby the complementary fit joints on the wall surfaces to guide the axially opposite ends of the roller are separated and staggered from each other at a mating surface bisecting a width of the wall surface and extending in parallel with rolling direction of the roller to make contact with the axially opposite ends of the roller at different locations, helping the roller get over the joints smoothly.

The present invention relates to a linear motion guide unit comprising an elongated guide rail having a first lengthwise raceway surface thereon, and a slider movable lengthwise of the elongated guide rail by virtue of more than one roller, the slider being comprised of a carriage made therein with a second raceway surface in opposition to the first raceway surface and a return passage extending in parallel with a load-carrying race defined between the first and second raceway surfaces, end caps mounted on lengthwise opposite ends of the carriage and made therein with turnaround passages connecting the load-carrying race with the associated return passage, and more than one roller allowed to roll through a circulating circuit composed of the load-carrying race, the return passage and the turnaround passages;

wherein the return passage is constituted with a hole of rectangular shape in transverse section inside a lengthwise tubular member that fits into a bore made in the carriage; wherein the tubular member is joined at lengthwise opposite ends thereof together to protrusions that are raised above end surfaces of the end caps to extend the turnaround passage into the bore; and wherein edges of the protrusions come into complementary fit joints with the associated ends of the tubular member to provide wall surfaces to guide axially opposite ends of the roller.

In one aspect of the present invention, a linear motion guide unit is disclosed in which the complementary fit joint is composed of a first joint and a second joint, which are different in length spaced away from the end surface of the end cap; and wherein the first and second joints are separated and staggered from each other at a mating surface bisecting a width of the wall surface and extending in parallel with rolling direction of the roller. As an alternative, the wall surface is bisected equally.

In another aspect of the present invention a linear motion guide unit is disclosed in which the wall surfaces lying in opposition to each other are disposed in a fashion that the first joint of one wall surface confronts the second joint of another wall surface while the second joint of one wall surface confronts the first joint of another wall surface.

In another aspect of the present invention, a linear motion guide unit is disclosed in which the tubular member is composed of longitudinal halves, which are coupled together to complete the tubular member; and wherein first butt edges for the first joint and second butt edges for the second joint on the halves are disposed in such a staggered fashion that the first butt edge of one half confronts the second butt edge of another half while the second butt edge of one half confronts the first butt edge of another half. In a further another aspect of the present invention, there is disclosed a linear motion guide unit in which the complementary fit joint, in addition to the first and second joints to guide the axially opposite ends of the roller, further includes a third, fourth and a fifth joints to guide a circular rolling surface of the roller, which are different in interval spaced away from the end surface of the end cap.

In another aspect of the present invention, a linear motion guide unit is disclosed in which the lengthwise opposite ends of the tubular member have respectively the first butt edges, the second butt edges, third butt edges for the a third joint, fourth butt edges for a fourth joint and fifth butt edges for a fifth joint in pairs.

In another aspect of the present invention, a linear motion guide unit is disclosed in which the protrusion raised above the end cap includes a first minor prominence for the first joint and a second major prominence for the second joint to guide the axially opposite ends of the roller, and a third major prominence for a third joint and a fourth minor prominence for a fourth joint to guide the circular rolling surface of the roller.

In another aspect of the present invention, a linear motion guide unit is disclosed in which the end cap is composed of an end cap major body defining a curved outside surface of an outer one of the turnaround passages and some part of a curved outside surface of an inner one of the turnaround passages, a first spacer part that fits into the end cap major body to define a curved inside surface of the outer turnaround passage and a remnant curved outside surface of the inner turnaround passage, and a second spacer part that fits into a shoulder between the end cap major body and the first spacer part.

In another aspect of the present invention, a linear motion guide unit is disclosed in which the protrusion raised above the end cap major body is made with the curved outside surface of the turnaround passage and the wall surface to guide the axially opposite ends of the roller. In a further another aspect of the present invention, there is disclosed a linear motion guide unit in which the curved outside surface of the outer turnaround passage in the end cap major body of the end cap is made with a lubricating hole to expose a lubricant impregnated member that fits into a recess in the end cap major body.

With the linear motion guide unit constructed as stated earlier, the rollers even though small in diameter are allowed to get over the joint between the turnaround passage and the associated return passage without getting stumbled or caught on any gap at the joint. Thus, the linear motion guide unit of the present invention can be expected to display the performances of high rigidity and accuracy even under severe operating requirements including high velocity and high acceleration/deceleration, thereby befitting for the relatively sliding parts in machinery including semiconductor fabricating equipment and measuring instruments.

DETAILED DESCRIPTION OF THE PREFERRED EMBODIMENTS

The linear motion guide unit constructed according to the present invention is best adapted for use in any relatively sliding components in machinery as diverse as semiconductor fabricating equipment, precision machines, measurement/inspection instruments, machine tools, assembling machines, conveyers, various types of robots, medical instruments, micromachines, and so on. More particularly, the present invention is envisaged the provision of a butt joint with no gap in a circulating circuit to let a rolling element of small roller run smoothly across the butt joint throughout the circulating circuit. Referring now in detail to the drawings, the linear motion guide unit according to the present invention will be explained below.

The linear motion guide unit of the present invention is most favorable for the sort whose rolling elements are of rollers 5 small in diameter, and further makes certain of smooth rolling of rollers 5 throughout a circulating circuit 60 even under severe operating condition in which a slider 2 is needed to make reciprocating movement relative to a guide rail 1 with more high-velocity and more acceleration/deceleration than ever. The linear motion guide unit of the present invention features a butt joint between a return passage 10 and a turnaround passage 20, especially a joint construction between an end cap 4 made therein with a turnaround passage 20 and a tubular member 30 fitted into a fore-and-aft hole 9 inside a carriage 3. The joint construction made as stated earlier is made up of from first to fifth butt joints 36-40, in which the tubular member 30 comes into mating with protrusions 50 raised above an inward end surface 35 of an end cap 4 to extend somewhat the turnaround passage 20. More especially, joint construction features the combination of the first and second butt joints 36 and 37 in which a guide surface to carry axially opposite ends 5E of the roller 5 is made by complementary fit of the protrusions with their receding counterparts. The first to fifth butt joints 36-40 are staggered in location from each other to get the rollers 5 tough to stumble on the fifth butt joints 36-40.

With the joint construction between the protrusions 50 of the end cap 4 and the associated end of the tubular member 30, the raised portion on the end cap 4 comes into positive mating with the counterpart on the tubular member 30 in a complementary relationship with each other and, therefore, the tubular member 30 despite made in circular contour is kept against angular change around its longitudinal axis to ensure the alignment with the associated end cap 4. With the prior linear motion guide units in which the rollers 5 small in diameter or needles 5 are in the circulating circuit 60, there is a major question that the conventional butt joint construction among necessary parts is easily accompanied by any gap or discrepancy relatively large compared with the diametrical dimension of the rollers 5. However, the efforts to make such gaps lessen would entail costly more precise finishing of the parts than done before. In contrast, the joint construction in the linear motion guide unit of the present invention is envisaged relieving the problem of the gap or discrepancy in the joint construction.

Figure 1:
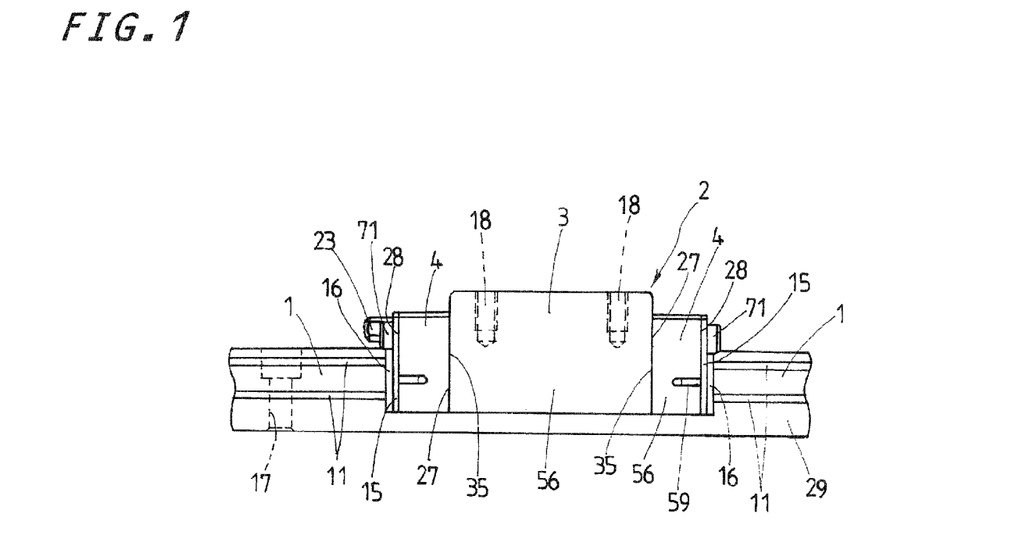
FIG. 1 is a view in front elevation showing a preferred embodiment of a linear motion guide unit according to the present invention.
Figure 3:
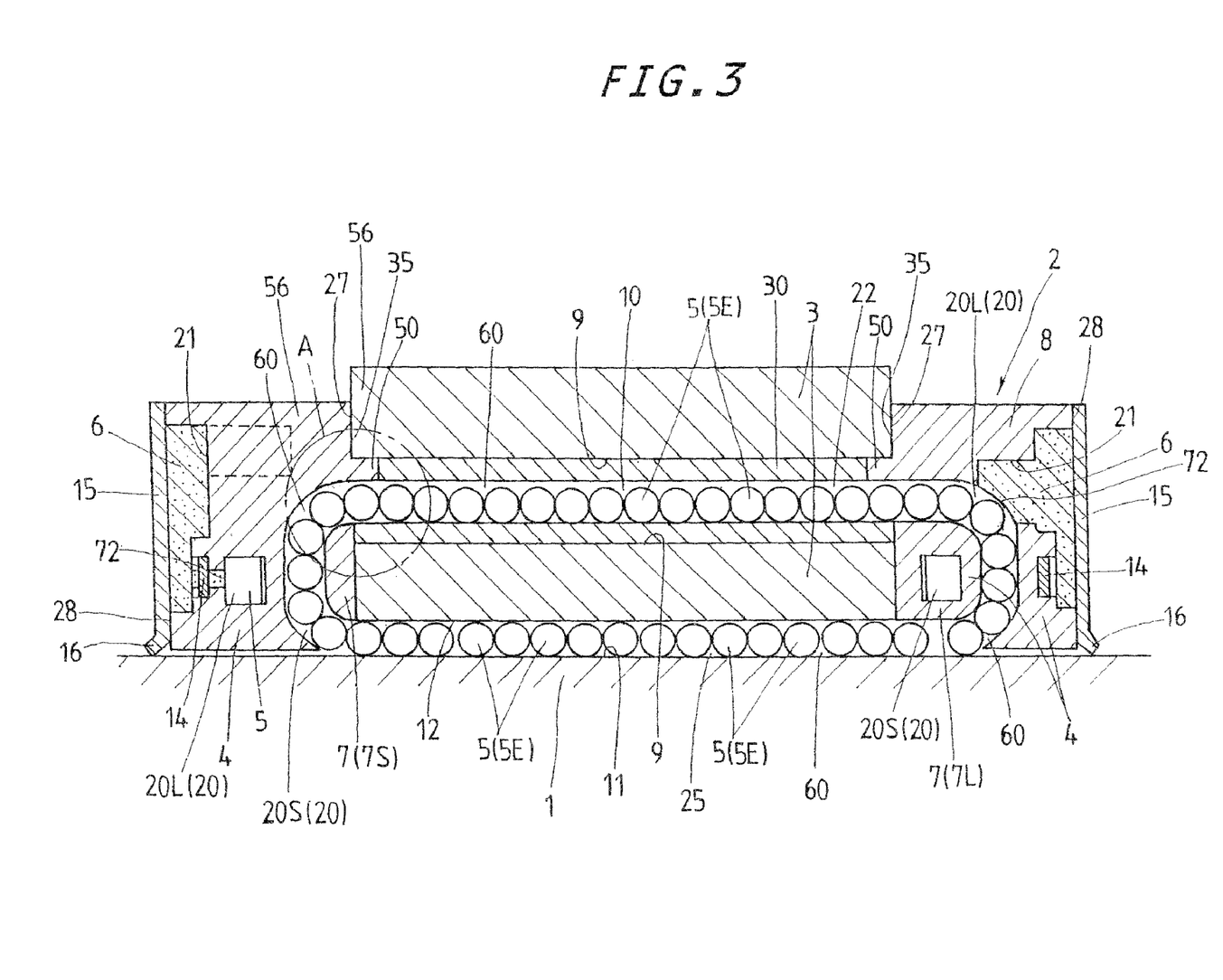
FIG. 3 is a schematic view in longitudinal section to illustrate a circulating circuit shown in FIG. 2.

The linear motion guide unit of the present invention, as shown in FIGS. 1 and 3, mainly comprised of an elongated guide rail 1 having widthwise opposing sides 29 on which paired raceway surfaces (first raceway surfaces) 11 are made to extend lengthwise of the guide rail 1, one pair to each side, and a slider 2 that fits over or conform to the guide rail 1 to move lengthwise of the guide rail 1 by virtue of more than one rolling element of roller 5. The guide rail 1 is made with some holes 17 that are positioned at regular intervals lengthwise of the guide rail 1 and used to fasten the guide rail 1 with bolts to any stationary bed including machine bed, mounting base, workbench, and so on. The slider 2 is composed of a carriage 3 made thereon with raceway surfaces (second raceway surfaces) 12 in opposition to the raceway surfaces 11 cut in the guide rail to define load-carrying races and return passages 10 extending in parallel with the load-carrying races 20, end caps 4 arranged on forward and aft ends 27 of the carriage 3, one to each end, and formed therein with turnaround passages 20 to connect the load-carrying race 25 with the associated return passage 10, end seals 15 attached to outward end surfaces 28 of the end caps 4 and made with sealing lips 16 to close clearances left between the guide rail 1 and the slider 2, and more than one roller 5 allowed to roll, through a circulating circuit 60, which is made up of the load-carrying race 20, return passage 10 and the turnaround passages 20 lying on opposite ends of the load-carrying race 20 and the return passage 10. The slider 2 further includes a retainer plate 13 extending lengthwise of the carriage 3 in opposition to the associated load-carrying races 25 to bear the rollers 5 thereon, and a binding strip 14 coming into engagement with the retainer plate 13 to fasten the retainer plate 14 to the carriage 3. On the carriage 3, there are made threaded holes 18 that are used to install any object including various instruments, works, and attachments thereon. With the linear motion guide unit, moreover, a grease nipple 23 is connected to an outward end surface of the end seal 15 to communicate with a lubrication port 62 in the end cap 4.

Figure 2:
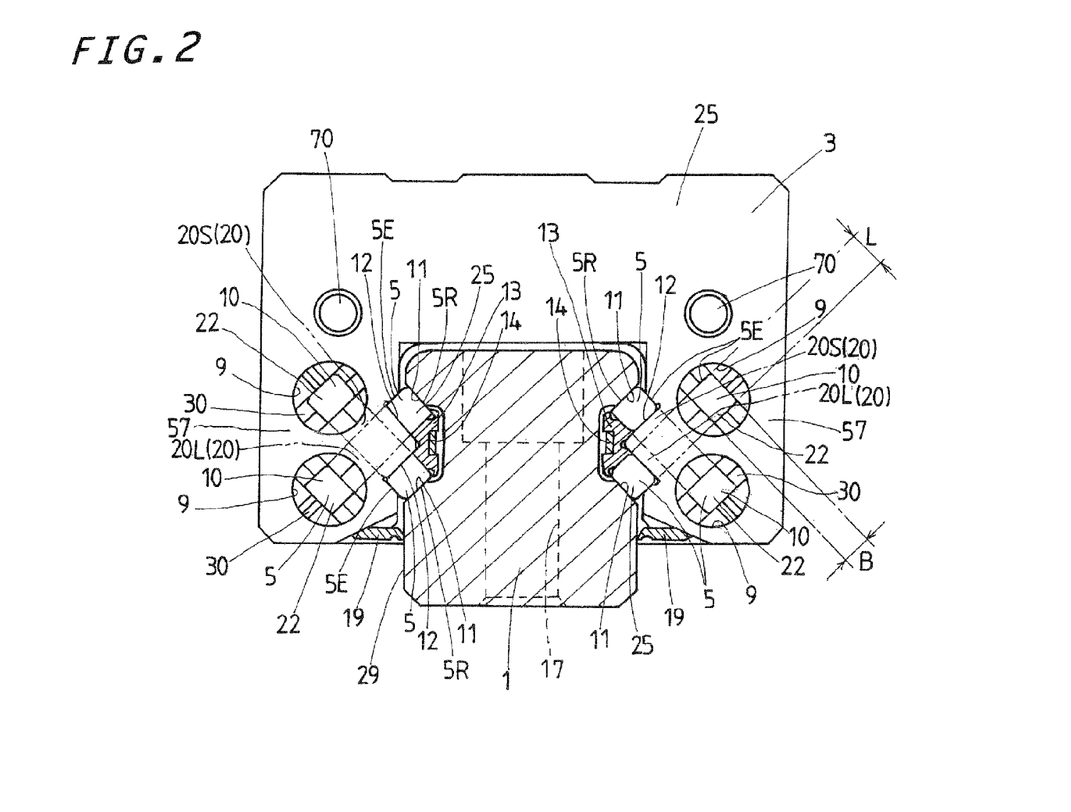
FIG. 2 is a view in end elevation partly in transverse section of the linear motion guide unit of FIG. 1, but in which an end cap is removed to expose any one end of a carriage.
Figure 8:
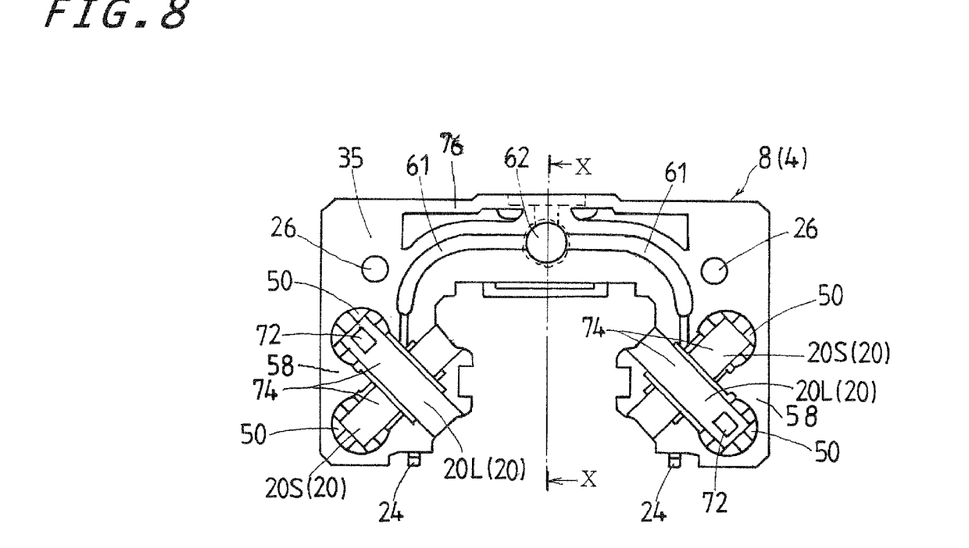
FIG. 8 is a view in rear or inward elevation of an end cap major part of FIG. 1.

The slider 2, as shown in FIG. 2, has the paired circulating circuits 60 in sidewise bulged portions 56, one circuit pair to each bulged portion. The rollers 5 rolling through any one of the paired circuits 60 circulate from the downside race 25 carrying thereon a downward load of the slider 2 into the upside return passage 10 in the carriage 3 while other rollers 5 running through another circuit 60 circulate from the upside race 25 carrying thereon an upward load of the slider 2 into the downside return passage 10 in the carriage 3. The turnaround passages 20 are made crossed or staggered (as shown in FIG. 8) one another in each one of sidewise bulged portions 58 of the forward and aft end caps 4. The rollers 5 in the load-carrying race 25 are kept with the elongated retainer plate 13 against falling apart from the slider 2 even after the slider 2 is dismantled from the guide rail 1. The elongated retainer plate 13 is laid in a way flanked by the raceway surfaces 12 on the carriage 3 and secured to the carriage 3 by means of binding strip 14 whose opposite ends 24 come into engagement with grooves 59 cut into the end caps 4.

Figure 6:
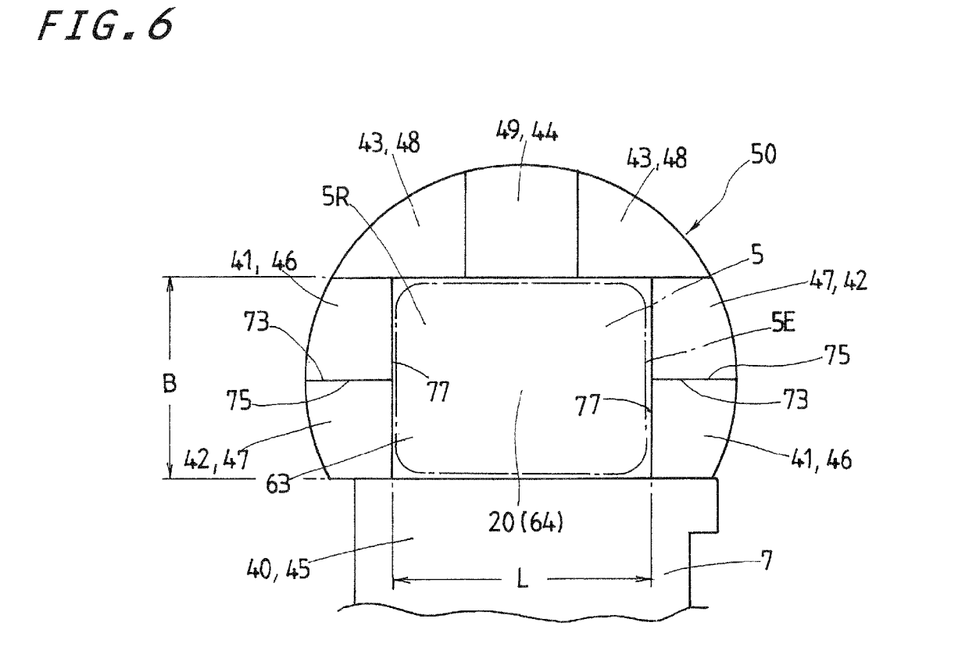
FIG. 6 is a view in front elevation of raised and recessed portions on an end cap shown in FIG. 4.

The tubular member 30 to define the return passage 10, as shown in FIG. 2 or 6, is made therein with a hole 22 rectangular in transverse section, which is somewhat larger in size to make sure of smooth rolling of the rolling elements of rollers 5. One side of the rectangular hole when viewed in transverse section has a length L somewhat longer than an axial length of the roller 5 while another side of the rectangular hole has a length B somewhat longer than a diameter of the roller 5. The holes to allow the rollers 5 rolling through there are made in the protrusions 50 on the end caps 4 as well. The opposite sides 77 of length L are to carry the axially opposite ends 5E of the roller 5. The return passage 10 is made straight in parallel with the load-carrying race 25.

Figure 5:
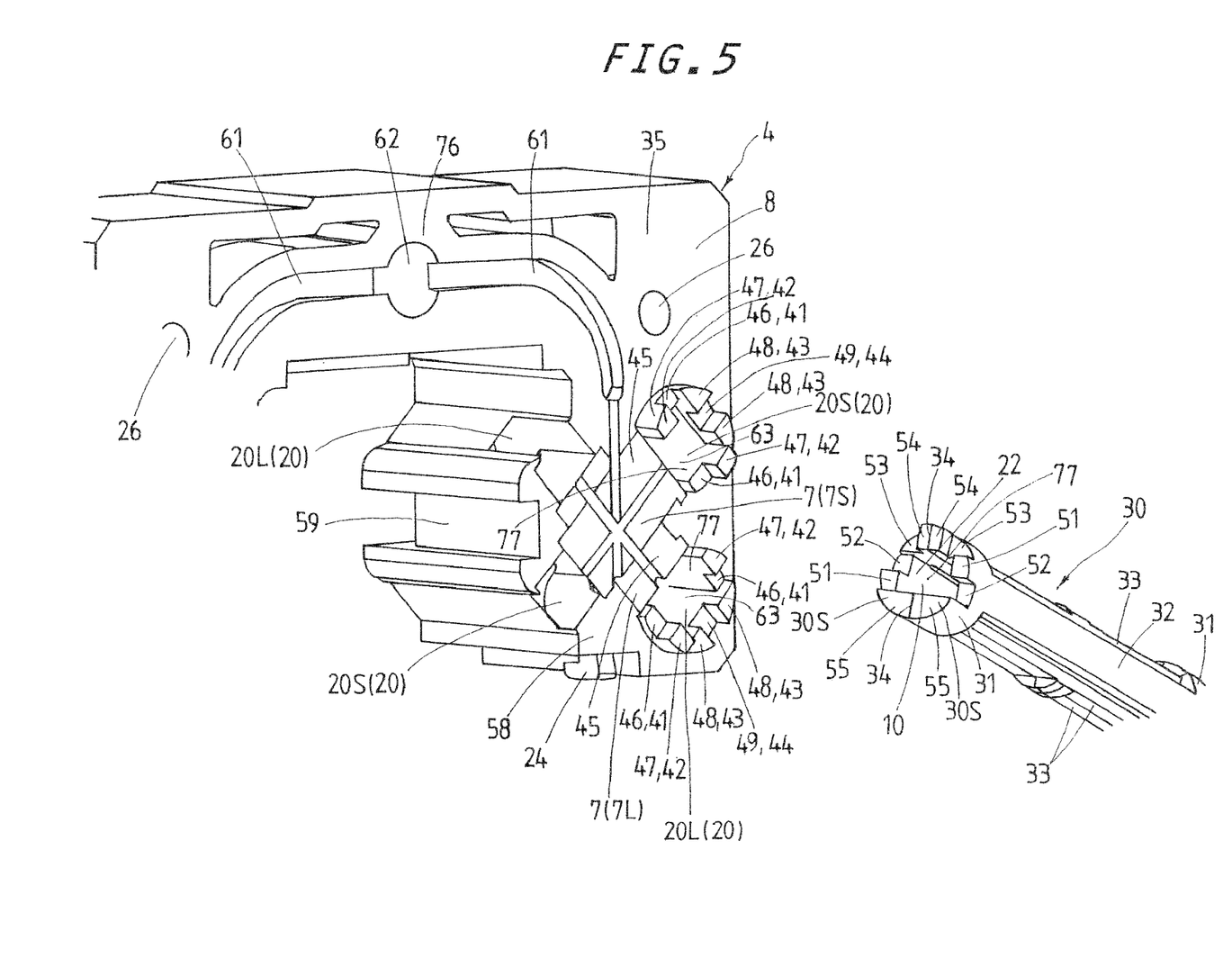
FIG. 5 is an exploded view in perspective showing the joint construction of FIG. 4.

The turnaround passages 20, as shown in FIG. 3, are made to intersect one other in the end cap 4 in such a staggered relation that any one 20L of the turnaround passages 20 is further out than the other 20S (refer to FIG. 5). The circulating circuit 60 is made up of the load-carrying race 25, return passage 10 and the pained turnaround passages 20, one of which is the outer turnaround passage 20L of long-oblong geometry and the other is the inner turnaround passage 20S of short-oblong geometry. A lubricant impregnated member 6 fits into a recess that is made to sink below the outward end surface 28 of the end cap 4. The lubricant impregnated member 6 is designed to reserve the lubricant ample to achieve sustainable maintenance-free condition for lubrication in despite of the linear motion guide unit made small in construction. The return passage 10 as shown in FIG. 2 is a lengthwise hole 22 of rectangular shape in transverse section, which is defined inside the tubular member 30 that fits into a fore-and-aft hole 9 bored in the carriage 3. The tubular member 30 joins at forward and aft ends thereof together with the protrusion 50 raised above the inward end surface 35 of an end cap 4 to extend somewhat the turnaround passage 20 into the fore-and-aft hole 9.

Figure 4:
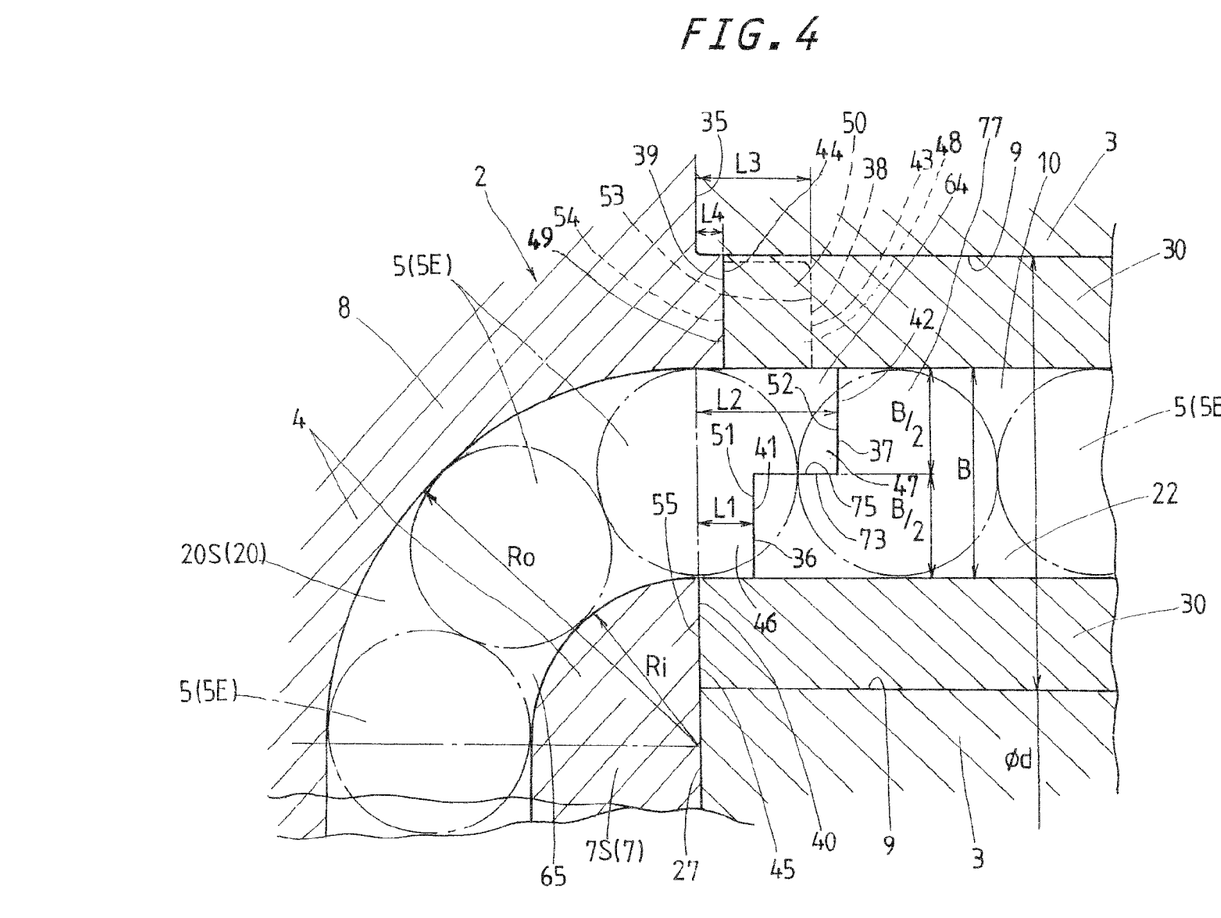
FIG. 4 is an enlarged schematic view to illustrate a joint construction surrounded with a circular line A in FIG. 3.

As apparent from FIGS. 3 and 4, the turnaround passage 20 to communicate between the load-carrying race 25 and the associated return passage 10 is constituted with a curved major route 65 and a straight minor route 64. More especially, the circulating circuit 60 made in the slider 2 is made up of the load-carrying race 25 defined between the raceway surface 11 on the guide rail 1 and the raceway surface 12 made on the carriage 3 in opposition to the raceway surface 11, the return passage 10 defined by the lengthwise hole 22 inside the tubular member 30 extending in parallel with the load-carrying race 25, and a pair of the turnaround passages 20 made in the forward and aft end caps 4, one to each end cap. Thus, the circulating circuit 60 is completed after the carriage 3 has joined together with the end caps 4. The circulating circuit 60 especially has to be finished to make sure of smooth transfer of the rollers 5 across the joints between the turnaround passage 20 and the associated return passage 10 without stumbling on the joints. For the provision of the joint construction to rule out the potential that the rollers 5 might stumble over the joint in the circulating circuit 60, it is inevitable to keep the rectangular shape in transverse section of the circulating circuit 60 against becoming lopsided or causing any gap at the joint construction. Meanwhile, on assembling of the parts including the carriage 3, end caps 4, lubricant impregnated member 6, end seals 15 and so on into the finished slider 2, it is substantially impossible to join the parts together with one another with causing no discrepancy or gap at the joint constructions, because the machining and assembling always have some error. Rework or readjustment of individual parts to offset the gap would introduce costly production requirements. The gap at the joint construction, albeit slightly in height, will become highly-potential risk of stumbling on the joints for the rollers 5 small or slender in diameter. It turns out how large the gap in height is relative to the diameter of the roller 5 does the matter.

The problem facing in the linear motion guide unit using the rollers 5 is whether the rollers 5, even small or slender in diameter, can get over easily some gap that might lurk at the joints 36~40. The roller 5 can easily get over the gap lying on the surface coming into rolling contact with a circular rolling circular surface 5R of the roller 5, but trends to stumble on the gap lying on the surface coming into sliding contact with the axially opposite ends 5E of the roller 5 and therefore more difficult to get over the gap. The linear motion guide unit of the present invention is envisaged letting the roller 5 easily get over the gap coming into contact with the axially opposite ends 5E of the roller 5. To this end, the surfaces coming into contact with the axially opposite ends 5E of the roller 5 is divided along the rolling direction of the roller 5 into the first and second joints 36 and 37 whose butt end surfaces 41 and 42 are laid in staggered relation to each other in the rolling direction of the roller 5.

Referring to FIGS. 4 to 7, there is shown the joint construction between the end cap 4 and the tubular member 30. The end cap 4 is composed of an end cap major body 8 made therein with curved outside surface flanked by side walls to define the turnaround passage 20 of rectangular shape when viewed in transverse sections, and a spacer part 7 made therein with a curved inside surface of the turnaround passage 20 to fit into the end cap major body 8 to complete the end cap 4. On an opening of the turnaround passage 20 facing on the associated return passage 10, there is made the protrusion 50 extending beyond the inward end surface 35 of the end cap major body 8 in a way fitting into the fore-and-aft hole 9 to communicate the turnaround passage 20 with the associated return passage 10. The protrusion 50 is made with curved outside surface flanked by side walls to define the three sides of the rectangular shape conforming to an open edge 63 of the turnaround passage 20.

Still referring to FIGS. 4 and 5, the joint construction between the end cap 4 and the tubular member 30 is composed of the first joint 36 of a first minor prominence 46 when viewed from the end cap 4, the second joint 37 of a second major prominence 47, a third joint 38 of a third major prominence 48, a fourth joint 39 of a fourth minor prominence 49, and a fifth joint 40 of the spacer part 7 lying in flush with the inward end surface 35 of the end cap major body 8. Especially, the first and second joints 36 and 37 to carry the axially opposite ends 5E of the roller 5 thereon are different from one another in joining location or butt-joint location with the tubular member 30 spaced away from the inward end surface 35 of the end cap 4. That is, the first and second joints 36 and 37 on the wall surface 77 to guide the axially opposite ends 5E of the roller 5 are different in prominence above the inward end surface 35 of the end cap 4 to make multiple complementary mating constructions with the tubular member 30 in staggered fashion from one another. The first and second joints 36 and 37 are made equal in their width by the division of the guide surface 77 into equal parts (B/2), and reversed in their disposition between the guide surfaces 77 that carry the axially opposite end surfaces 5E of the roller 5. Moreover, the first and second joints 36 and 37 are different in prominence L1, L2 above the inward end surface 35 of the end cap 4. A mating side surface 73 of the second joint 37 extending in the rolling direction of the roller 5 comes into close engagement with another mating side surface 75 extending in parallel with the rolling direction of the roller 5 toward a first butt edge 51 of the tubular member 30.

With the linear motion guide unit constructed as stated earlier, the joints 36 and 37 of the protrusion 50 are made to divide the width B of the guide surface 77 into equal parts and staggered from one another in stepwise fashion. Thus, the protrusion 50 is made up of the second prominence 47 of the width B/2 raised above the inward end surface 35 of the end cap 4 over a distance L2, and the first prominence 46 of the width B/2 raised above the inward end surface 35 of the end cap 4 over another distance L1 (L1<L2). The second prominence 47 extends to far exceed the first prominence 46 to provide the mating side surface 73 extending in the rolling direction of the roller 5 beyond the first prominence 46. In the tubular member 30, on the other hand, the first butt edge 51 extends more towards the protrusion 50 than a second butt edge 53 to provide the mating side surface 75 extending in parallel with the rolling direction of the roller 5. The mating surfaces 73 and 75 come into close engagement with each other along a plane extending in parallel with the rolling direction of the roller 5 to form the joint construction successful in guiding smoothly the axially opposite ends 5E of the roller 5.

With the linear motion guide unit constructed as shown in FIG. 4, the joint construction on the wall surface 77 to guide the axially opposite ends 5E of the roller 5 is made to divide the width B of the guide surface 77 into equal parts and staggered in stepwise fashion and has advantages as stated later.

The linear motion guide unit constructed as stated earlier, even if any clearance or gap is left around the first joint 36 and/or the second joint 37, can keep the roller 5 against falling into or stumbling over the clearance, making much surer of the smooth rolling of the roller 5 across the joints than in the prior one. The roller 5 of, for example, Φ 2×2.5 stumbled on the clearance at the joint as small as 0.16 mm in the traditional joint construction. But the same roller 5 was successful in smooth transfer across the clearance at the joint as much as 0.31 mm in the joint construction of the present invention. With the linear motion guide unit of the present invention, moreover, the first and second joints 36 and 37 are switched or staggered each other in place between the opposite wall surfaces 77 in such a fashion that the first joint 36 in one wall surface 77 confronts the second joint 37 in another wall surface 77 while the second joint 37 in the one wall surface 77 confronts the first joint 36 in another wall surface 77. The staggered disposition of the first and second joints 36 and 37 as stated just above makes sure of smooth transfer across the joint even with any gap or discrepancy. The roller 5 of, for example, Φ 2×2.5 caught on the gap or difference in level at the joint as small as 0.05 mm in the traditional joint construction. But the same roller 5 was successful in smooth transfer across the gap at the joint as much as 0.26 mm in the joint construction of the present invention.

With the linear motion guide unit of the present invention, the forward and aft ends of the tubular member 30 are made stepwise in complementary conformity with the protrusions 50 of the end caps to have a first butt edge 51 coming into butt joint against the first minor prominence 46 and a second butt edge 52 coming into butt joint against the second major prominence 47. The first joint 36 is constituted with the first butt edge 51 and the first prominence 46 coming into butt joint with each other while the second joint 37 is constituted with the second butt edge 52 and the second prominence 47 coming into butt joint with each other. Between the first and second joints 36 and 37, there are provided the mating surfaces 73, 75 lying in conforming to and confronting each other. The first joint 36 and/or the second joint 37 need not throughout come into abutment against each other and they are allowed to leave a slight clearance between them. Nevertheless, it is preferable to rather bring the first and second joints 36 and 37 into close engagement with each other to leave no clearance between the mating surfaces to keep the tubular member 30 against relative rotation. With the wall surfaces 77 lying in opposition to guide the axially opposite ends 5E of the roller 5, in addition, the first joint 36 in one wall surface 77 confronts the second joint 37 in another wall surface 77 while the second joint 37 in the one wall surface 77 confronts the first joint 36 in another wall surface 77. With the staggered disposition of the first and second joints 36 and 37 as stated just above, each of the jots 36 and 37 accounts for only a half the width of the wall surface. Thus, the roller 5, even if getting encountered with any gap, is hard to get toppled down there and caught on the wall surfaces 77. The joint construction of the present invention is expected to make certain of smooth sliding movement in the liner motion guide unit using the small rollers, which has become widely used in recent years in various working environments.

As seen in FIG. 5, the first to fifth points 36~40 are composed of the first to fifth butt end surfaces 41~44 of the first to fifth prominences 46~49 on the end cap major body 4 of the end cap 4, a butt end surface 45 of the spacer part 7, and first to fifth butt edges 51~55 on the tubular member 30 to come into abutment or opposition to the associated butt end surfaces on the end cap 4 as recited just above. On the wall surfaces 77 lying in opposition, the first joint 36 in one wall surface 77 confronts the second joint 37 in another wall surface 77 while the second joint 37 in the one wall surface 77 confronts the first joint 36 in another wall surface 77. The first to fifth joints 36~40 includes the first joint 36 raised above the inward end surface 35 of the end cap 4 over the distance L1 to a joining location, the second joint 37 raised over a distance to inward end surface 35 of the end cap 4 over the distance L2 to another joining location, the third joint 38 extending over a distance L3 to a further another joining location, the fourth joint 39 extending over a distance L4 of another joining location, and the fifth joint 40 lying in flush with the rearward surface of the spacer part 7. The protrusion 50 is made to communicate straight with the lengthwise hole 22 inside the return passage 10 to allow the rollers 5 rolling through across the joints with steadiness in their posture.

Still referring to FIG. 5, the first to fifth joints 36~40 are shown as being exploded into the end cap 4 and the tubular member 30. In the first joint 36, the first butt end surface 41 of the first prominence 46 less in raised amount comes into mating with the first butt edge 51 more in raised amount of the tubular member 30. In the second joint 37, the second butt end surface 42 of the second prominence 47 more in raised amount comes into mating with the second butt edge 52 less in raised amount of the tubular member 30. In the third joint 38, the third butt end surface 43 of the third prominence 48 more in raised amount comes into mating with the third butt edge 53 less in raised amount of the tubular member 30. In the fourth joint 39, the fourth butt end surface 44 of the fourth prominence 49 less in raised amount comes into mating with the fourth butt edge 54 more in raised amount of the tubular member 30. Further in the fifth 40, the fifth but end surface 45 lying on the end surface of the spacer part 7 comes into mating with the fifth butt edge 55 of the tubular member 30. With the first to fifth joints 36~40 between the end cap 4 and the tubular member 3 constructed as stated earlier, the butt end surfaces 41~45 on the protrusion 50 of the end cap 4 come into fit into the associated butt edges 51~55 on the tubular member 30 in a complementary manner with each other to make certain of positive connection between them with preventing the tubular member 30 against angular movement relative to the end cap 4.

Still referring to FIG. 6, the protrusion 50 of the end cap 4 has the wall surfaces 77 lying in opposition to each other to carry the axially opposite ends 5E of the roller 5. Any one of the wall surfaces 77 of the protrusion 50 has the first prominence 46 and the second prominence 47 while another wall surface 77 has the second prominence 47 and the first prominence 46. The fourth prominence 49 flanked by the third prominences 48 extends from the curved outside surface of the turnaround passage 20 at the middle of the axial length of the roller 5 to guide the circular rolling surface 5R of the roller 5. The fifth butt end surface 45 is placed on the rearward surface of the spacer part 7.

Figure 7:
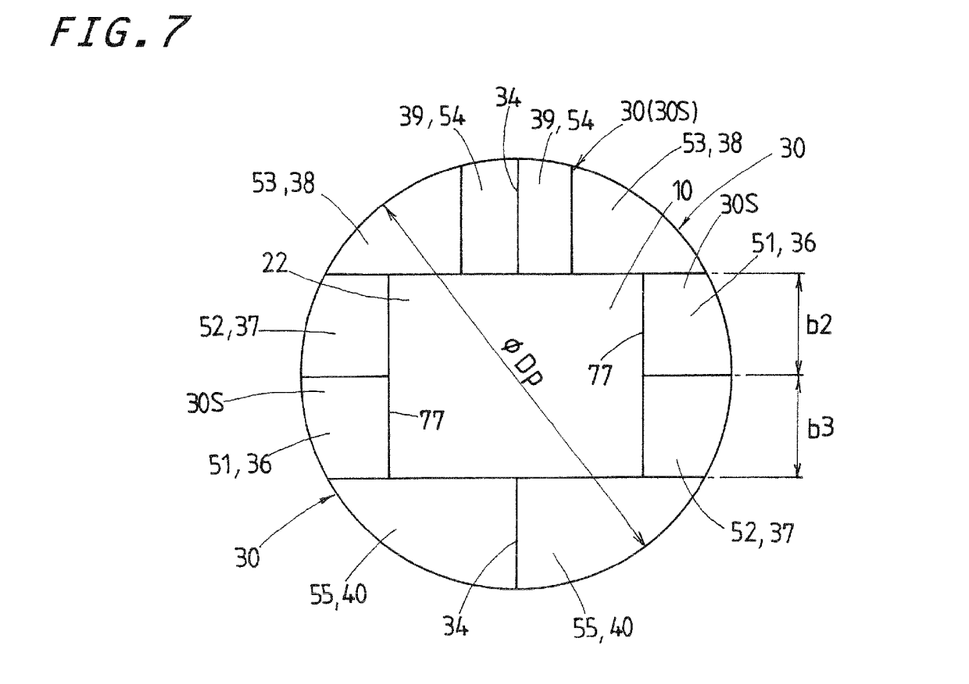
FIG. 7 is a view in end elevation of a tubular member of FIG. 4.

The tubular member 30, as shown in FIG. 7, is bisected 1 into two longitudinal halves 30S as seen in detail in FIGS. 11 to 15 on a lengthwise plane lying midway of the circular rolling surface 5R of the roller 5. Thus, the longitudinal halves 30S join together on their mating lengthwise surfaces into the tubular member 30. On the forward and aft ends of the tubular member 30, there are the wall surfaces 77 lying in opposition to each other to carry the axially opposite ends 5E of the roller 5. Any one of the wall surfaces 77 of the tubular member 30 has the first butt edge 51 and the second butt edge 52 while another wall surface 77 has the second butt edge 52 and the first butt edge 51. The fourth butt edge 54 flanked by the third butt edges 53 lies on the extension from the curved outside surface of the turnaround passage 20 at the middle of the axial length of the roller 5 to guide the circular rolling surface 5R of the roller 5. The fifth butt edge 55 is made in opposition to the rearward surface of the spacer part 7. Thus, a set of the first butt edge 51, second butt edge 52, third butt edge 53, fourth butt edge 54 and the fifth butt edge 55 is made on the forward and aft ends of each one of the longitudinal halves of the tubular member 30.

Figure 9:
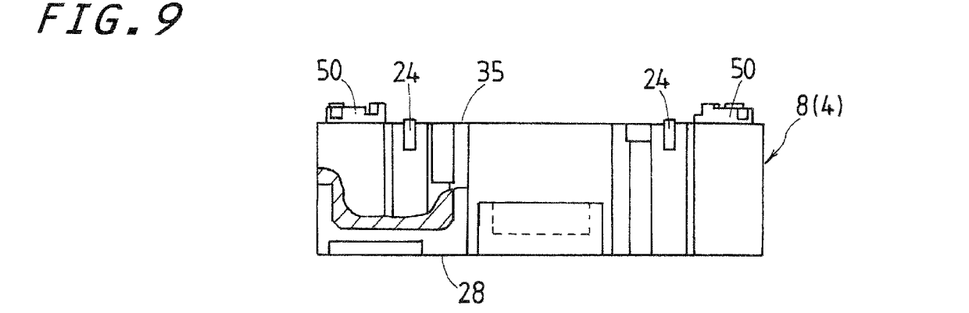
FIG. 9 is a view in bottom elevation of the end cap major part of FIG. 8.
Figure 10:
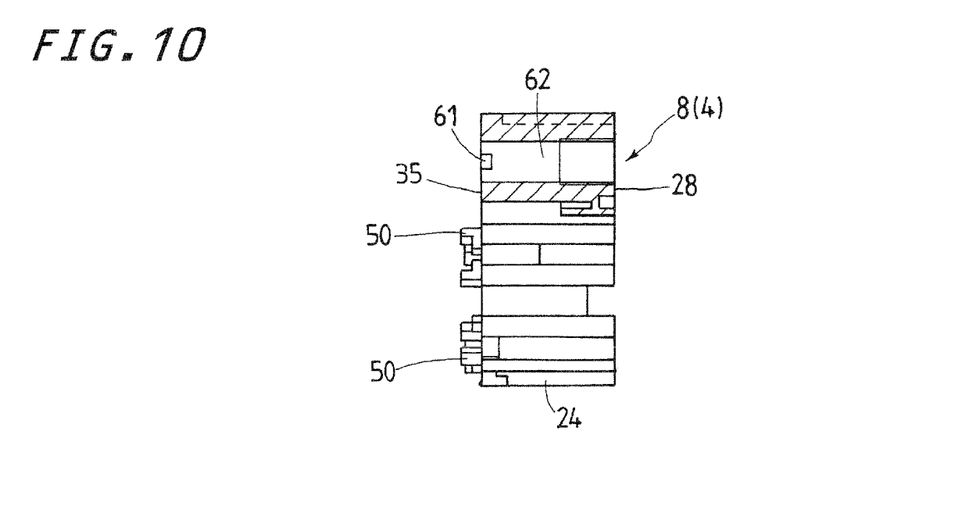
FIG. 10 is a view in section of the end cap major part taken along the plane of the line X-X of FIG. 8.
Figure 11:
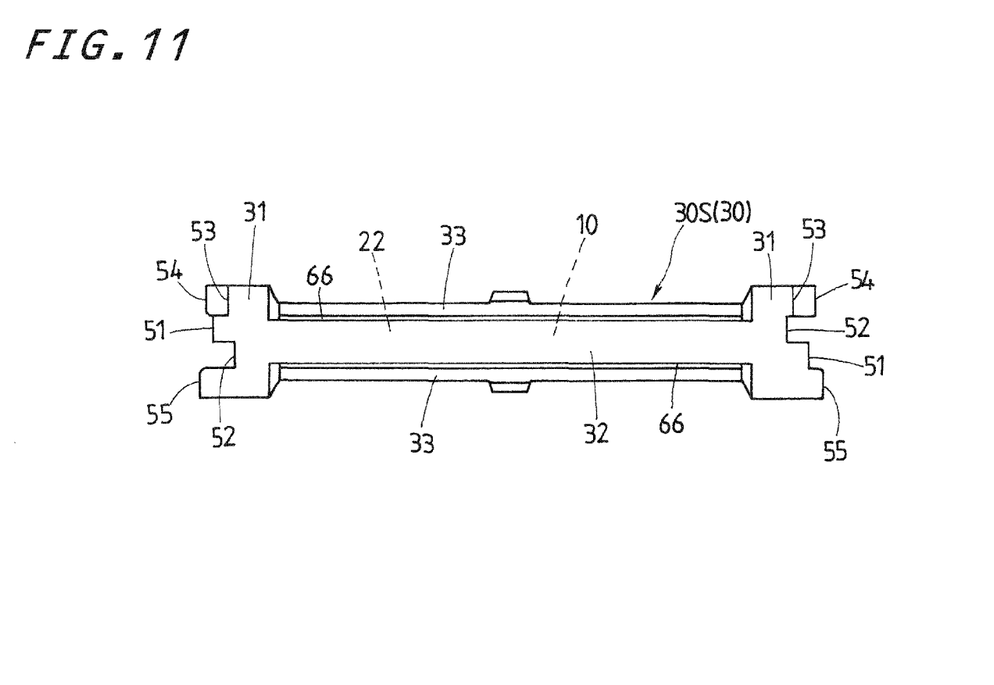
FIG. 11 is a view in front elevation of a half section of the tubular member of FIG. 2.

Referring to FIGS. 8, 9 and 10, there is shown the end cap major body 8 with the spacer part 7 being demounted from the cap 4. The end cap major body 8 is comprised of an upper portion 76 and sidewise opposite bulgy portions 58 depending down from widthwise opposite ends of the upper portion 76. The end cap major body 8 is recessed to fit over or conform to the guide rail 1. The end cap major body 8 is made with widthwise opposite holes 26 that are used to fasten the end cap major body 8 to the carriage 3 with using screws 71. The end cap major body 8 is made recessed at 74 in the sidewise opposite bulgy portions 58 thereof to accommodate the spacer part 7 therein to form the turnaround passages 20. The recess 74 is designed to define the curved outside surface of the outer turnaround passage 20L and communicated to a lubricating hole 72. On the sidewise opposite bulgy portions 58 of the end cap 4, there are provided the protrusions 50 that are raised above the inward end surface 35 around the open edges 63 of the outer and inner turnaround passages 20L and 20S in longitudinally alignment with the associated return passages 10. On the bottoms of the bulgy portions 58, hooks 24 are attached to keep lower seals 19. The upper portion 76 of the end cap major body 8 is made at the middle thereof with the lubrication port 62 that gets opened to the inward end surface 35. Oil grooves 61 are cut to extend from the lubrication port 61 to the turnaround passages 20.

Referring to FIGS. 11 to 15, the tubular member 30 is made up of two longitudinal halves 30S, which join together on their mating lengthwise surfaces. The tubular member 30 is composed of forward and aft cylindrical ends 31, a pair of rigid columns 32 extending longitudinally to integrally connect forward and aft cylindrical ends 31 to each other while providing wall surfaces 77 to guide the axially opposite ends 5E of the roller 5, and a pair of flexible columns 33 extending longitudinally to integrally connect forward and aft cylindrical ends 31 to each other while coming into elastic rolling contact with the circular rolling surface 5R of the roller 5. The adjoining rigid column 32 and flexible column 33 are separated with longitudinal slit 66. Although the tubular member 30 has circular lines altogether, only the flexible columns 33 are reduced radially to get spaced away from the fore-and-aft hole 9 inside the carriage 3 to permit the flexing of the flexible columns 33. The halves 30S of the tubular member 30 have mating surfaces 34, respectively, one of which has tenons 67 at the cylindrical ends 31 and another has mortises the cylindrical ends 31 to fit over the associated tenons 67. The halves 30S even though inverted over 180° each other, can be coupled together to finish the tubular member 30. The first butt edges 51 and second butt edges 52 extending along the columns 32 beyond the cylindrical ends 31 of the tubular member 30 are beveled at 69 to make it easier to get their butt joints with the first butt end surfaces 41 of the first prominence 46 and the second butt end surface 42 of the second prominence 47 to make certain of smooth transfer of the roller 5 across the butt joints.

Figure 12:
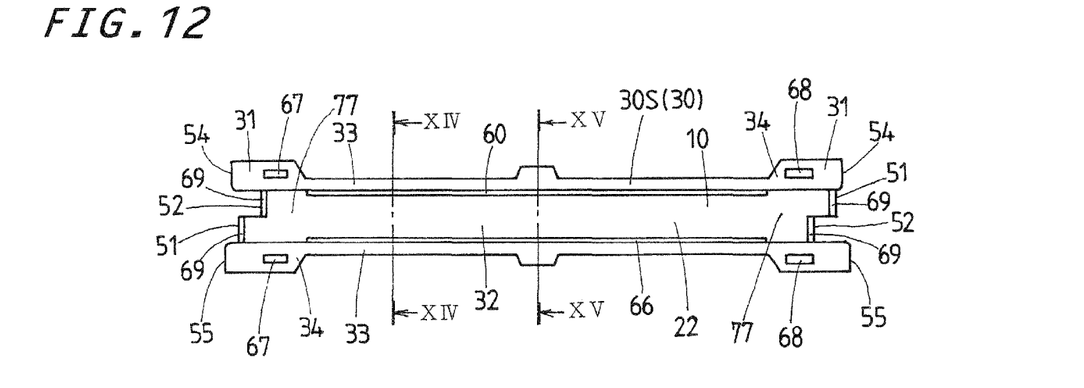
FIG. 12 is a view in rear elevation of the half section of the tubular member of FIG. 11.
Figure 13:
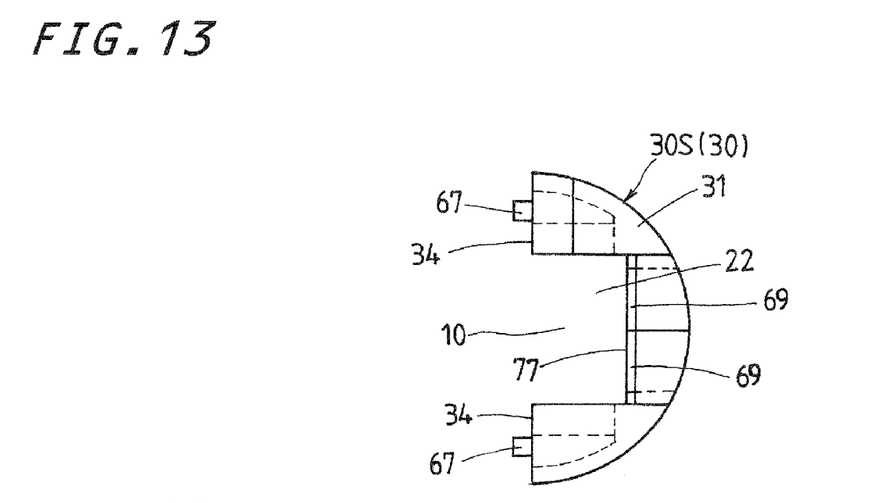
FIG. 13 is a view in side elevation of the half section of the tubular member of FIG. 12.
Figure 14:
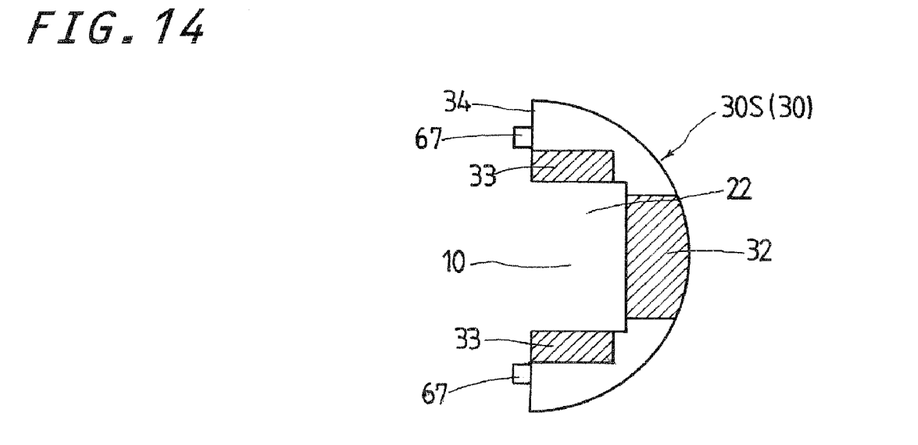
FIG. 14 is a view in transverse section of the half section of the tubular member taken along the plane of the line XIV-XIV of FIG. 12.
Figure 15:
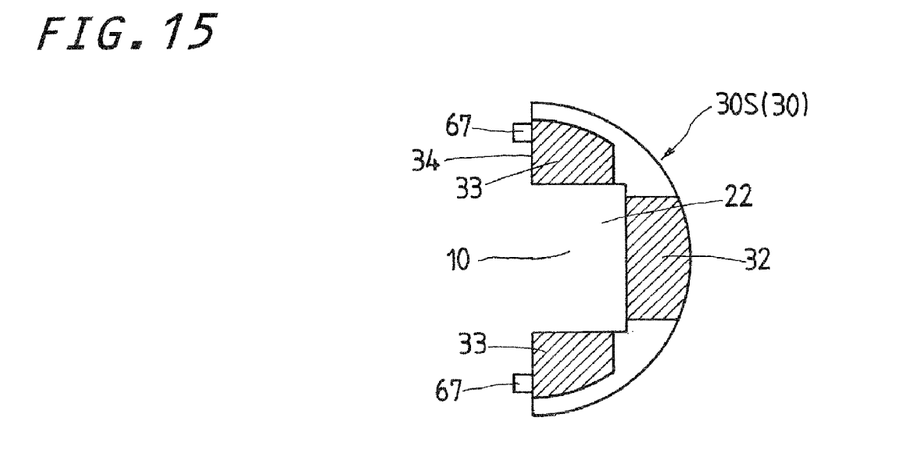
FIG. 15 is a view in transverse section of the half section of the tubular member taken along the plane of the line XV-XV of FIG. 12.

As seen in FIG. 12, the first and second butt edges 51 and 52 on the halves 30S of the tubular member 3C are disposed or switched each other between the halves 30S in such a staggered fashion that the first butt edge 51 of one half 30S confronts the second butt edge 52 of another half 30S while the second butt edge 52 of one half 30S confronts the first butt edge 51 of another half 30S. Once the halves 30S have been assembled together, the first butt edge 51 of one wall surface 77 confronts the second butt edge 52 of another wall surface 77 while the second butt edge 52 of one wall surface 77 confronts the first butt edge 51 of another wall surface 77.

The joint construction as stated earlier makes sure of smooth transfer across the joint from the turnaround passage 20 and the return passage 10 and vice versa.

What is claimed is:
1. A linear motion guide unit comprising
an elongated guide rail (1) having a first lengthwise raceway surface (11) thereon, and a slider (2) movable lengthwise of the elongated guide rail by rollers (5),
the slider (2) being comprised of a carriage (3) having a second raceway surface (12) in opposition to the first raceway surface (11) and a return passage (10) extending in parallel with a load-carrying race (25) defined between the first raceway surface (11) and the second raceway surface (12),
an end cap (4) mounted on each lengthwise opposite end (27) of the carriage (3) and made therein with turnaround passages (20, 20L, 20S) connecting the load-carrying race (25) with the return passage (10), and wherein the rollers (5) are allowed to roll through a circulating circuit (60) composed of the load-carrying race (25), the return passage (10) and the turnaround passages (20, 20L, 20S);
wherein the return passage (10) is constituted with a hole (22) of rectangular shape in transverse section inside a lengthwise tubular member (30) that fits into a bore (9) in the carriage (3);
wherein the tubular member (30) is joined at lengthwise opposite ends thereof together to protrusions (50) that are raised above end surfaces (35) of the end caps (4) to extend the turnaround passage (20, 20L, 20S) into the bore (9);

wherein edges (41, 42, 43, 44) of one of the protrusions (50) come into complementary fit joints (36, 37, 38, 39, 40) with one of the lengthwise opposite ends (51-54) of the tubular member (30);

wherein the complementary fit joints (36, 37, 38, 39, 40) each connect the return passage (10) to the turnaround passages (20, 20L, 20S) and provide wall surfaces (77) opposite to each other to guide axially opposite ends (5E) of the rollers (5), the wall surfaces (77) being each bisected into two equal parts, one of said parts has a first joint (36) of the complementary fit joints (36, 37, 38, 39, 40) lying between a minor prominence (46) raised above the end cap (4) and a first butt edge (51) of the tubular member (30) while the other of said parts has a second joint (37) of the complementary fit joints (36, 37, 38, 39, 40) lying between a major prominence (47) raised above the end cap (4) and a second butt edge (52) of the tubular member (30) and wherein the first joints (36) and the second joints (37) in the wall surfaces (77) are staggered from each other in a stepwise fashion in a rolling direction of the rollers (5) and wherein the axially opposite ends (5E) of the rollers (5) are in sliding contact with the wall surfaces (77) so as to slide smoothly across the first joints (36) and the second joints (37), and wherein the wall surfaces (77) lying in opposition to each other are disposed in such a staggered manner that the first joint (36) on one of the wall surfaces (77) is confronted with the second joint (37) on another wall surface (77) while the second joint (37) on one of the wall surfaces (77) is confronted with the first joint (36) on the another wall surface (77).

2. A linear motion guide unit constructed as defined in claim 1, wherein the tubular member (30) is composed of longitudinal halves (30S), which are coupled together to complete the tubular member; and wherein the ends of the tubular member (30) each comprise the first butt edges (51) for the first joint (36) and the second butt edges (52) for the second joint (37) on the halves (30S) so that the first joint (36) and the second joint (37) are disposed in such a staggered fashion that the first butt edge (51) of one half (30S) confronts the second butt edge (52) of another half (30S) while the second buttedge (52) of one half (30S) confronts the first butt edge (51) of another half (30S).

3. A linear motion guide unit constructed as defined in claim 1, wherein the complementary fit joints, in addition to the first and second joints (36, 37) to guide the axially opposite ends of the roller, further includes a third, fourth and a fifth joints (38, 39, 40) to guide a circular rolling surface (5R) of the roller, which are different in interval spaced away from the end surface (40) of the end cap (4).

4. A linear motion guide unit constructed as defined in claim 3, wherein the lengthwise opposite ends of the tubular member (30) have respectively the first butt edges (51) included in the first joints (36) of the complementary fit joints (36, 37, 38, 39) in the wall surfaces (77), the second butt edges (52) included in the second joints (37) of the complementary fit joints (36, 37, 38, 39, 40) in the wall surfaces (77), third butt edges (53) included in the third joints (38) of the complementary fit joints (36, 37, 38, 39, 40), fourth butt edges (54) included in the fourth joints (39) of the complementary fit joints (36, 37, 38, 39, 40) and fifth butt edges (55) included in the fifth joints (40) of the complementary fit joints (36, 37, 38, 39, 40).

* * * * *